Figure 1:
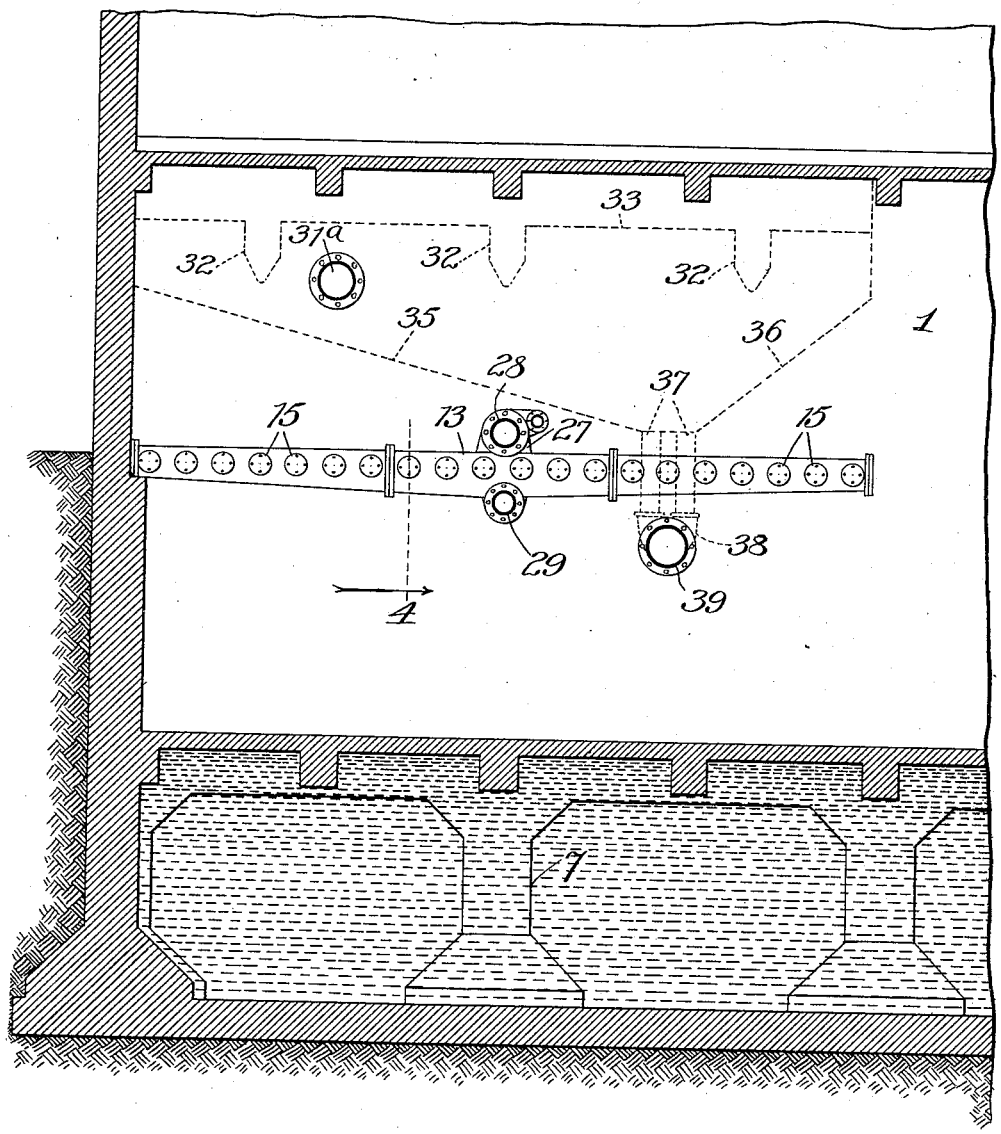

H. A. ALLEN.
UNDERDRAIN FILTRATION SYSTEM.
APPLICATION FILED DEC. 2, 1915.

1,189,521.

Patented July 4, 1916.
4 SHEETS—SHEET 1.

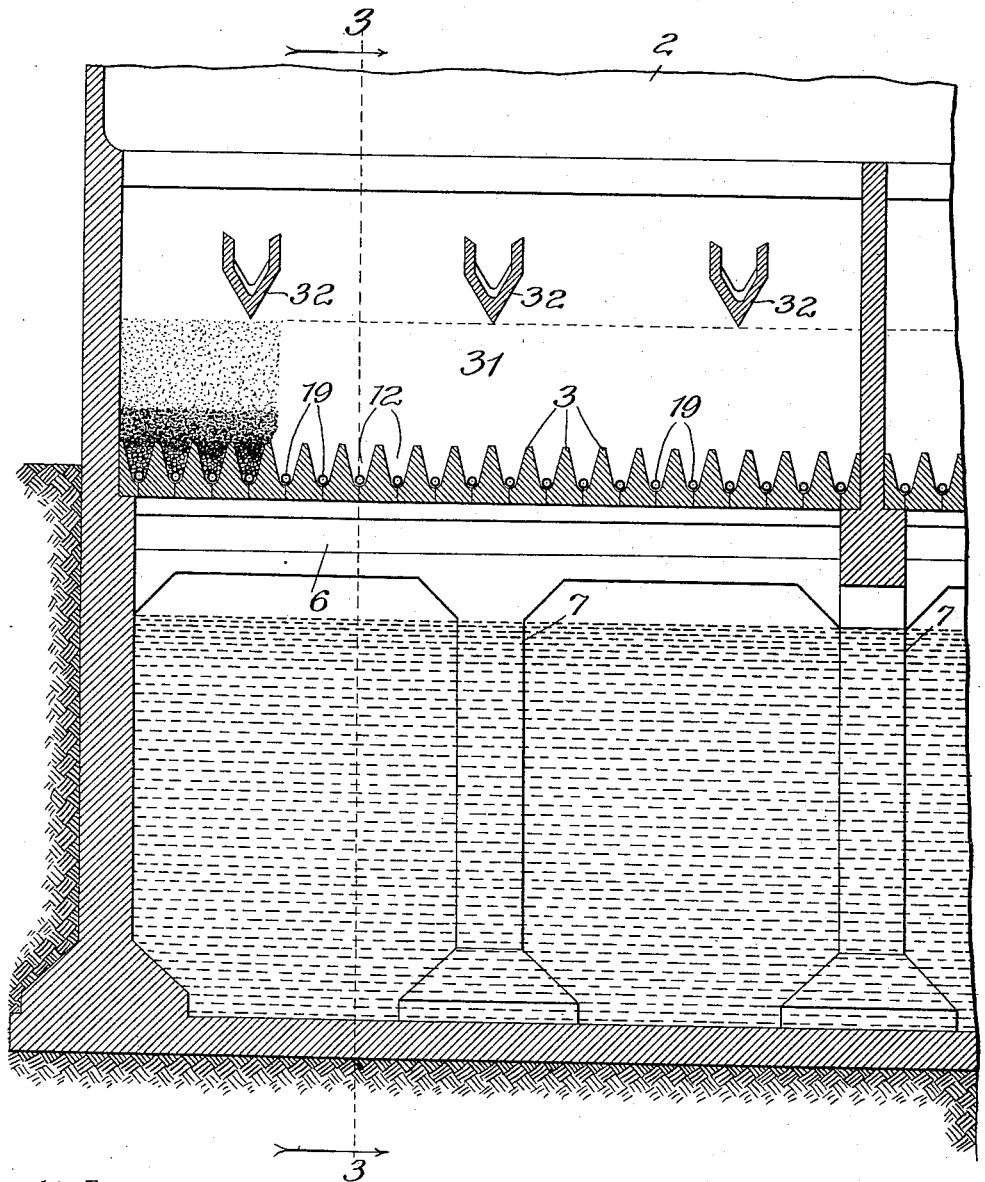

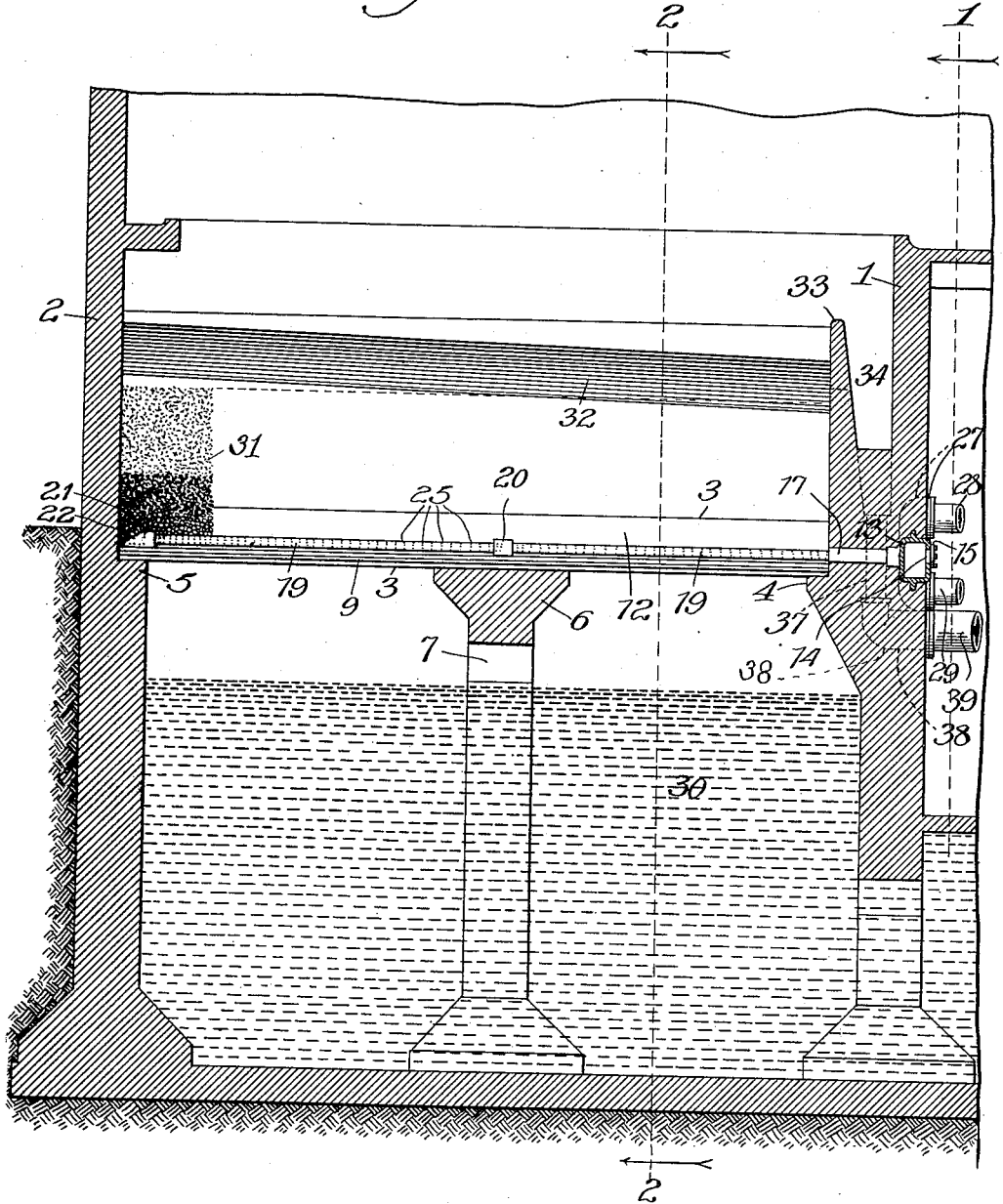

H. A. ALLEN.
UNDERDRAIN FILTRATION SYSTEM.
APPLICATION FILED DEC. 2, 1915.
1,189,521.
Patented July 4, 1916.
4 SHEETS—SHEET 4.
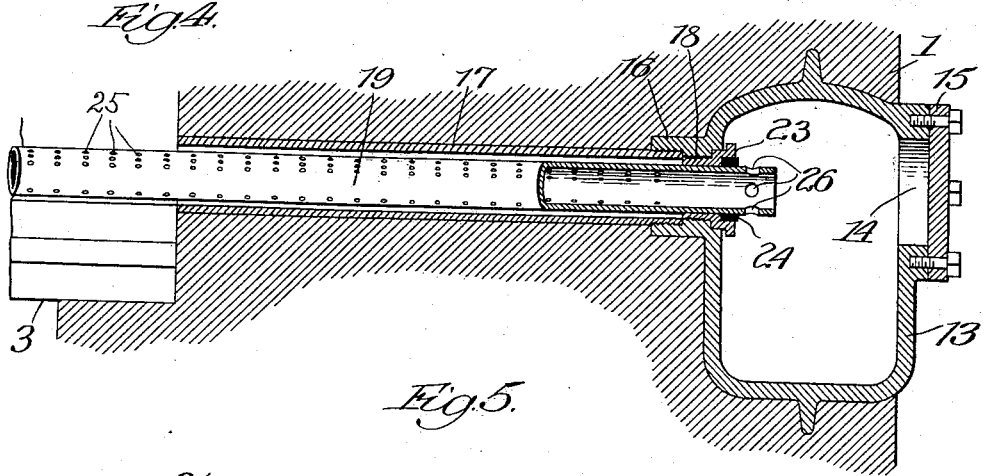
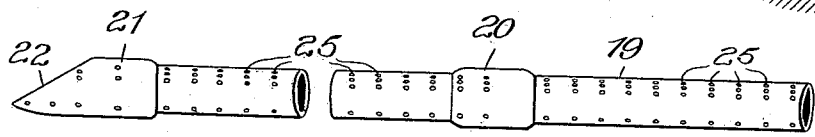
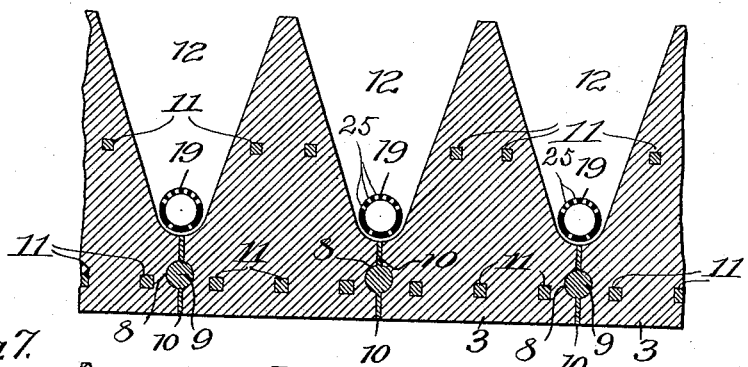
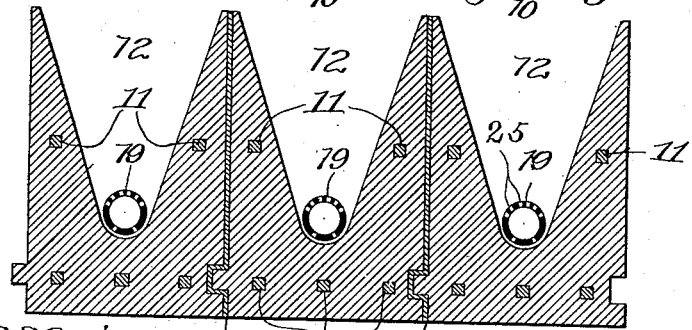
Witnesses:
Inventor:
Henry A. Allen.
By David H. Fletcher.
Atty.

UNITED STATES PATENT OFFICE.

HENRY A. ALLEN, OF CHICAGO, ILLINOIS.

UNDERDRAIN FILTRATION SYSTEM.

1,189,521. Specification of Letters Patent. Patented July 4, 1916.

Application filed December 2, 1915. Serial No. 64,716.

*To all whom it may concern:*

Be it known that I, HENRY A. ALLEN, a citizen of the United States, residing at Chicago, in the county of Cook and State of Illinois, have invented certain new and useful Improvements in Underdrain Filtration Systems, of which the following is a description, reference being had to the accompanying drawings, forming a part of this specification, in which corresponding numerals of reference in the different figures indicate like parts.

My invention relates to what is commonly known as the underdrain system as applied to filtration beds for filtering water, and particularly to that type in which the water to be filtered is caused to percolate through a bed of porous material, such for example as sand and gravel. In such systems the porous material is sustained by means of suitable supports in a bed of considerable thickness upon a floor above the clear water well, the water to be filtered being admitted to the bed from above while water or air, or water and air together, or in series may be from time to time admitted from below and forced upwardly under considerable pressure for the purpose of washing the impurities from the filtering material and carrying it away through a separate predetermined channel. Not only does the weight of the filtering material constitute an important factor to be reckoned with, but the pressure incident to washing often tends to disturb the screens and other parts located within the bed, thereby causing it to be forced upwardly, and the holding bolts, bars or other supporting or connecting parts to be broken or so disarranged as to require replacement. It frequently happens that it is necessary to remove the entire body of filtering material in order to find and repair a given part. Again, in most systems, tubes, or spray-beds are located in the bottom of the filtering material with a view of securing a uniform distribution. Portions of these frequently become foul or incrusted, or what are known as "dead-spaces" where the wash-water or percolated water cannot readily penetrate, serve as locations for the ready growth of oxygen consuming bacteria.

The object of my invention is to overcome these difficulties and objections by providing a filtering system which shall be so arranged as to admit of the least possible dead or inactive space, which shall be so constructed that the concrete materials comprising the floor of the filter-bed and serving to separate the distributing pipes, may be appropriately designed and formed by reinforcement or otherwise; so as to truss and give the desired strength to the floor and reduce redundant material to a minimum without interfering with the uniformity of water distribution.

A further object is to so construct said floor with its reinforcing members and distributing tubes that any one or more of said tubes may be inspected, removed and cleaned or repaired and replaced without removing any portion of the filtering material. To these and other subsidiary ends, my invention consists in the combination of elements hereinafter more particularly described and claimed.

In the drawings, Figure 1, is a vertical sectional view of a portion of a building containing a filtering plant, said section being taken through what is commonly known as the "gallery" adjacent to the filtering bed and at right angles to the distributing tubes. Fig. 2 is a vertical section taken upon the line 2—2, Fig. 3 viewed in the direction of the arrow there shown. Fig. 3 is a vertical section taken upon the line 3—3, Fig. 2, viewed as indicated by the arrows. Fig. 4 is an enlarged section in detail taken upon the line 4—4, Fig. 1, viewed in the direction of the arrow there shown. Fig. 5, is a view showing portions of one of the distributing tubes. Fig. 6, is an enlarged transverse vertical sectional view of a portion of the floor of the filter bed, showing the form of the valleys with the distribution pipes therein, and Fig. 7, is a like view showing a modified construction.

Referring to the drawings, 1, Figs. 1 and 3, represents the wall of the pipe gallery, and 2, Figs. 2 and 3, the outer wall of the filtering bed which is arranged parallel therewith.

The floor of the filtering bed is composed of a series of beams generally designated by 3, which are arranged parallel to each other and at right angles to the wall 1, of the pipe gallery. Said beams are formed from concrete or analogous cementitious material and have their ends supported upon ledges 4 and 5, Fig. 3 of the end walls, while the intermediate parts are sustained by means of a center cross-beam 6, Figs. 2 and 3, mounted upon pillars 7. The beams, as preferably formed, are inverted V-shape in cross-section, with their bases juxtaposed as shown generally in Fig. 2, so that said bases may form a continuous floor, the spaces between the upper portions forming a series of valleys or parallel channels extending from the back to the front walls of the filter gallery. The concrete beams are preferably cast in forms outside of the filter structure and placed in position therein with a space between adjacent beams to provide for grouting.

In order to insure tight joints where the grouting is inserted, I prefer to form longitudinal grooves such as are shown at 8, Fig. 6, in the sides. By carefully grouting the intervening space represented at 9 and 10 respectively, the floor may be made water tight. The grouting may consist of asphaltic cement or other elastic equivalent to relieve undue stresses in the material of the filter bed due to changes of temperature or otherwise. I prefer to reinforce the beams 3 by embedding therein during the molding process, a series of steel bars 11, Figs. 6 and 7, which serve to impart strength and rigidity to the structure while lessening the quantity of material required therein.

In the preferred construction shown in Fig. 6, it will be noted that the connecting joints of the beams are in vertical planes midway between the latter and constitute the center lines of the channels or valleys 12. The apices of the beams are uniform in height and are as nearly level as may be. In the face of the wall 1 of the pipe gallery is embedded a header 13, Figs. 1, 3 and 4, preferably made in sections, as indicated in Fig. 1, if the filter-bed is of a considerable size. Said header may be made of cast iron and is provided with a series of hand-holes 14, Fig. 4, equi-distant from each other and normally closed by means of caps 15, bolted thereto as shown. Opposite to each of the openings 14, is a smaller opening surrounded by a nipple 16, into which is tapped one end of a short horizontally arranged pipe 17, permanently embedded in the wall.

Among other purposes, an important function of the pipes 17 is to serve as forms in constructing the concrete wall. Annular plugs 18, Fig. 4, are tapped into the several openings surrounded by the nipples 16. Located in the valleys 12, and extending throughout the length thereof, are distributing pipes or tubes 19, made from bronze or analogous material, which tubes are by preference, made in sections connected by means of sleeves 20, riveted or brazed thereto. Each tube is provided with a shoe 21, upon its inner end, having a downwardly tapered nose 22, for the purpose hereinafter stated. The sleeve 20 and shoe 21 are of like diameter and serve to hold the tube above the bottom of the valley 12, so as to leave a small space between them. The short pipes 17 are of sufficient inner diameter to permit the tube 19 with the shoe and sleeve thereon to be readily projected therethrough after which the plug 18 is inserted over the end of the tube 19 and screwed into place. Said plug which serves to center the tube 19, is provided with an enlarged flange 23 to provide an annular space between it and the tube for the insertion of packing 24. It will thus be seen that the plugs serve to center the tubes 19 which are held thereby in uniform relation to the valleys, the sleeves and shoes coacting therewith to properly space the tubes with respect to such valleys. Each tube is provided with a series of perforations 25, which I prefer to arrange symmetrically not only to facilitate work in drilling, but to insure a proper and uniform distribution as well.

There should be an upper and lower system of holes,—the former for permitting a discharge in a plane above the horizontal and the latter in a plane below the horizontal plane. The purpose of the lower holes is to permit fresh water to flow beneath the tube in the process of washing so as to flush out the space between it and the valley, thereby tending to prevent the formation of slime or bacterial growths. The holes above the horizontal plane serve in effect to form fan-shaped sprays conforming in shape substantially to the cross-sectional area of the valleys, thereby practically eliminating dead spaces. Holes 26, Fig. 4, are formed in the outer ends of the tubes 19, to permit the insertion and withdrawal thereof or to provide for its proper adjustment with respect to the distributing holes. The distributing holes in the tubes 19 should commence at the plug or bushing 18, so as to thoroughly flush out the space between said tube and the tube 17. The header 13 is provided midway between its ends, with an enlarged portion 27, Figs. 1 and 3, with the upper part of which is connected an inlet pipe 28, while the lower portion has connected therewith an outlet pipe 29. The pipe 28 is adapted to be connected in any approved way with a force pump or an air compressor or both, while the latter leads to the clear water well 30, Figs. 2 and 3 in any approved way.

It will be noted by reference to Fig. 1 that the header 13 is largest at the middle and is tapered in opposite directions toward the ends, the degree of taper being such as to conform substantially to the number of distributing tubes so as to insure uniformity of distribution.

It is understood that the floor and adjacent walls may be water-proofed in any well known way.

The filter-bed 31 is composed in the usual way of coarse and fine material, such for example as gravel and sand the former being used to fill the valleys while the latter is placed above it. The inlet-pipe 31ª, Fig. 1, for the supply of unfiltered water is located substantially at the level of the upper surface of the filter bed.

A series of wash-water troughs 32 indicated in dotted lines in Fig. 1 and shown in full lines in Figs. 2 and 3, are arranged parallel to each other above the filter-bed extending from the rear wall 2, to and through a supplemental wall 33, which is located parallel to the wall 1; the bottom portion of the wall 33, being integral with said wall 1, but inclined inwardly therefrom so as to form a trough 34 at right angles to the troughs 32 and in communication therewith so that all of the latter may discharge into said trough 34. The bottom of said last named trough is inclined downwardly from its outer ends as indicated in dotted lines 35, 36, Fig. 1, to a predetermined point at which said lines converge, at which point vertical drain-pipes 37, 37 indicated in dotted lines in Figs. 1 and 3, are extended downwardly between the distributing tubes 19 and connected by means of an elbow union 38, to an effluent pipe 39, leading to a sewer.

An important advantage of the construction described and the relation of the filter-bed to the adjacent pipe gallery is that the distributing elements of the under-drain system of the filter-bed are at all times accessible from the pipe gallery, it being understood that the piping in the latter should not interfere with the removal and replacing of drain-tubes.

The operation of the device is as follows: Water to be filtered is admitted through the inlet-pipe 31ª to the filter-bed through which it percolates to the distributing pipes 19. Passing through the openings 25 therein it is discharged through the outer ends of the pipes into the header 13, through which it passes to the effluent pipe 29, and thence to the reservoir or clear water basin 30. When necessary to wash the filter-bed the effluent pipe 29 is closed, and water, with or without air, is forced under pressure through the pipe 28, and thence through the distributing tubes 19, upwardly through the filter-bed, until it rises above the upper edges of the drain-troughs 32. Flowing through said troughs it is delivered to the discharge trough 34 and thence through the pipes 37 and pipe 39 to the sewer, carrying with it the accumulated impurities, sediment and other matter which may have lodged in the filtering bed. Not only is the water discharged from the filtering pipes with such uniformity as to eliminate "dead-spaces" but the filtration is equally uniform, the water passing downwardly through the bed to the openings 25 over the entire surface. Should a distributing pipe become clogged the obstruction may be removed either by forcing air or water or both therethrough as would be done in washing, or the pipe may be inspected, withdrawn, cleaned, and replaced without removing any portion of the filter-bed, the tapered shoe enabling the distributing pipe to be readily pushed into the valley beneath the filter bed. The advantage of this feature is too obvious to require special mention.

A further advantage of the perforated distributing tubes is that should a local obstruction or stoppage occur in any part thereof it may be removed by inserting a special tool therein through which air may be forced and so localized as to cause the removal of an obstruction at any point without necessitating the removal of the tube.

In Fig. 7, I have shown a modified construction in which the valley is wholly formed in a given beam instead of between two beams and the grouted joints 40 between adjacent beams extend from the bottom to the apex.

I do not wish to be limited to the exact construction shown inasmuch as it may be varied without departing from the principle involved.

Having thus described my invention, I claim:—

1. In an underdrain filtering system, a filtering-bed floor having formed therein a plurality of substantially parallel valleys for the reception of distributing pipes, perforated distributing pipes located in said valleys, a header in communication with the ends of said pipes said header being provided with openings in its outer wall for the passage of said pipes to permit their insertion or removal, and means for normally closing said openings.

2. An underdrain filtering system comprising a filtering bed floor having therein a plurality of substantially parallel valleys for the reception of distributing pipes, perforated distributing pipes located in said valleys, a filter gallery having therein a header arranged at an angle to the axes of said pipes and in communication with the open ends thereof, said header being provided with normally closed openings in its outer wall accessible from said filter gallery, a filtering bed, means for forcing fluid under pressure into said header and means for draining said bed from the upper surface thereof.

3. In an underdrain filtering system, a filtering-bed floor for the reception of distributing pipes, said floor comprising a plurality of juxtaposed reinforced concrete beams forming longitudinal valleys for the reception of distributing pipes, said beams being grouted together upon their lines of juncture.

4. In an underdrain filtering system, a filtering-bed floor for the reception of distributing pipes composed of a series of juxtaposed reinforced concrete beams, the upper portion of which are constructed to form longitudinal valleys while aiding to resist vertical stress.

5. In an underdrain filtering system, a filtering-bed floor for the reception of distributing pipes composed of a series of juxtaposed reinforced concrete beams, said beams being cut away from a level above the base to the top to form valleys for said pipes.

6. In an underdrain filtering system, a filtering-bed floor, having formed therein a plurality of substantially parallel valleys for the reception of distributing pipes, of a header arranged at an angle to said valley, a plurality of perforated distributing pipes arranged to be projected into said valleys through said header, said pipes being in open communication at one end with said header and provided with tapered shoes upon their inner ends to permit their insertion within the valleys beneath a filtering-bed.

7. In an underdrain filtering system, a filtering-bed floor provided with a plurality of substantially parallel valleys for the reception of distributing pipes of a header arranged at an angle to the axes of said valleys, a plurality of perforated distributing pipes arranged to be projected into said valleys through said header said pipes being in open communication at one end with said header and having tapered shoes upon their inner ends to permit their insertion beneath a filtering-bed, the openings in said header being larger than the diameter of said pipes, and means for centering said pipes and for hermetically sealing the aperture between them and the openings therefor in said header.

8. In an underdrain filtering system, a filtering-bed floor provided with a plurality of substantially parallel valleys for the reception of distributing pipes, a pipe-gallery wall arranged at an angle to the axes of said valleys, a header located therein, pipe openings in said header in alinement with said valleys, centering pipes tapped into said openings, said pipes being embedded in said wall, a plurality of perforated distributing pipes projected through said centering pipes into said valleys, said distributing pipes being in communication with said header, bushings for centering said pipes while sealing the annular space around them and an effluent pipe in operative communication with said header.

9. In an underdrain filtering system, a filtering-bed floor having therein a plurality of parallel valleys for the reception of distributing pipes, said valleys being wider at the top than at the bottom, distributing pipes perforated to project jets radially therefrom at predetermined angles, means for spacing said pipes from the surfaces of said valleys and means for projecting fluid under pressure into said pipes and through said perforations.

10. A filter system comprising, in combination, a filter-bed, a pipe gallery arranged adjacent thereto, and an underdrain system having draining and distributing elements accessible from the pipe gallery, whereby said elements may be inspected, cleaned, removed, repaired or replaced from said gallery.

11. A filter system comprising, in combination, a filter-bed, a pipe gallery having a header therein for the reception of removable distributing pipes, said gallery being so formed and located with respect to said bed as to permit the endwise insertion and removal of pipes.

In testimony whereof, I have signed this specification in the presence of two subscribing witnesses, this 30th day of November, 1915.

HENRY A. ALLEN.

Witnesses:
DAVID H. FLETCHER,
ERIK L. KRAG.

Copies of this patent may be obtained for five cents each, by addressing the "Commissioner of Patents. Washington, D. C."